United States Patent
Chen et al.

(10) Patent No.: US 8,243,054 B2
(45) Date of Patent: Aug. 14, 2012

(54) LCD AND DISPLAY PROPERTY ADJUSTING METHOD THEREOF

(75) Inventors: Yang-Yuan Chen, Taipei Hsien (TW); Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 558 days.

(21) Appl. No.: 12/497,710

(22) Filed: Jul. 6, 2009

(65) Prior Publication Data

US 2010/0302222 A1    Dec. 2, 2010

(30) Foreign Application Priority Data

May 31, 2009    (CN) .......................... 2009 1 0302781

(51) Int. Cl.
*G06F 3/038* (2006.01)
(52) U.S. Cl. .................. 345/207; 345/87; 345/697
(58) Field of Classification Search .............. 345/87–89, 345/102, 207, 697
See application file for complete search history.

(56) References Cited

U.S. PATENT DOCUMENTS

| | | | | |
|---|---|---|---|---|
| 6,069,597 A | * | 5/2000 | Hansen | 345/74.1 |
| 7,388,569 B2 | | 6/2008 | Agari et al. | |
| 2002/0195954 A1 | * | 12/2002 | Kim | 315/149 |
| 2004/0155853 A1 | * | 8/2004 | Lin | 345/102 |
| 2005/0134547 A1 | * | 6/2005 | Wyatt | 345/102 |
| 2006/0007223 A1 | * | 1/2006 | Parker | 345/207 |
| 2009/0128529 A1 | * | 5/2009 | Izumi et al. | 345/207 |
| 2009/0267876 A1 | * | 10/2009 | Kerofsky | 345/87 |

FOREIGN PATENT DOCUMENTS

| CN | 1602442 A | 3/2005 |
|---|---|---|
| CN | 1838224 A | 9/2006 |

* cited by examiner

*Primary Examiner* — Amare Mengistu
*Assistant Examiner* — Koosha Sharifi-Tafreshi
(74) *Attorney, Agent, or Firm* — Altis Law Group, Inc.

(57) ABSTRACT

A liquid crystal display (LCD) includes a graphic processor, a number of sensors, an optical signal collecting unit, a property saving unit, a property comparing unit, and a property setting unit. The optical signal collecting unit receives optical analog signals generated by the number of sensors, and converts the received optical analog signals into optical digital signals. The property saving unit saves a number of predetermined display properties and a number of predetermined optical signal ranges. The property comparing unit receives the optical digital signals and compares the optical digital signals with the plurality of predetermined optical signal ranges, and correspondingly selects corresponding predetermined display properties. The property setting unit receives the selected display properties and outputs the selected display properties to the graphic processor to adjust display properties of the LCD.

5 Claims, 3 Drawing Sheets

LCD AND DISPLAY PROPERTY ADJUSTING METHOD THEREOF

BACKGROUND

1. Technical Field

The present disclosure relates to a liquid crystal display (LCD) and a display property adjusting method of the LCD.

2. Description of Related Art

Nowadays, display properties of LCDs may be adjusted by manipulation of one or more switches mounted on the LCD. However, this manual operation mode may be complicated for young children.

DETAILED DESCRIPTION

Figure 1:
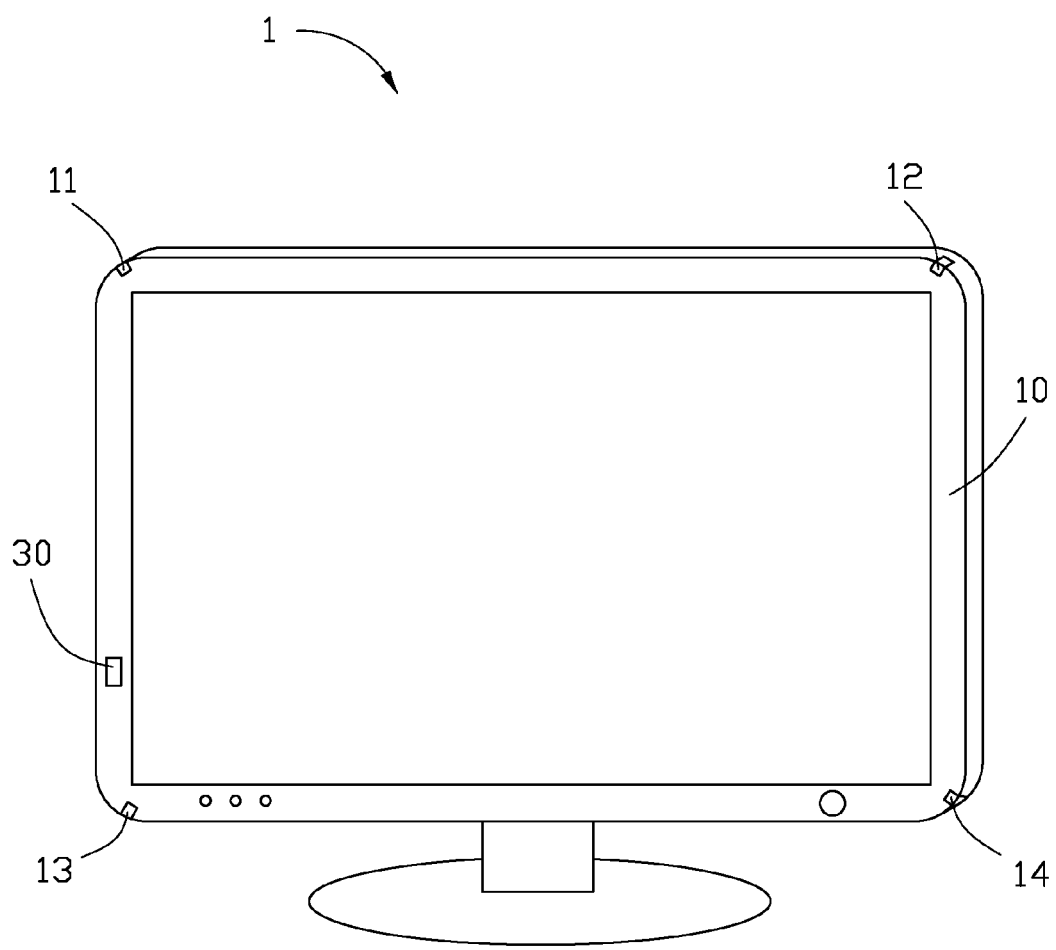
FIG. 1 is a schematic view of an exemplary embodiment of an LCD.
Figure 2:
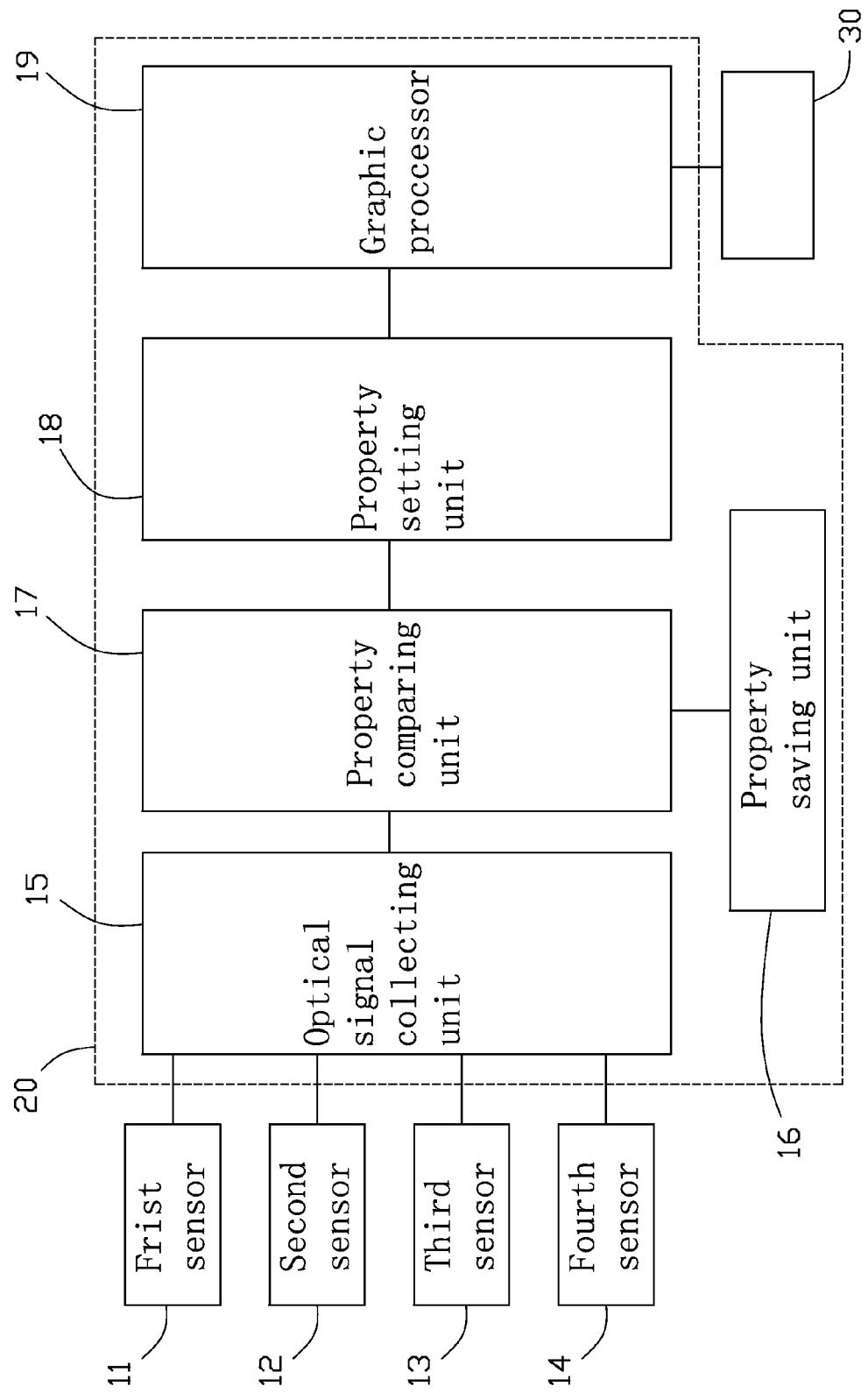
FIG. 2 is a circuit block diagram of the LCD of FIG. 1.

Referring to FIGS. 1 and 2, an exemplary embodiment of a liquid crystal display (LCD) 1 includes a main body 10 and a display circuit 20 positioned inside the main body 10. The display circuit 20 is used to automatically adjust display properties of the LCD 1 for accommodating eyes of users.

The main body 10 is approximately rectangular-shaped. First to fourth sensors 11-14 are mounted on four corners of the main body 10 correspondingly. An auto-adjusting switch 30 is mounted on a side of the main body 10. In other embodiments, the number of the sensors can be changed according to requirements. The sensors 11-14 and the auto-adjusting switch 30 can be mounted on other positions of the main body 10 according to requirements.

The display circuit 20 includes an optical signal collecting unit 15, a property saving unit 16, a property comparing unit 17, a property setting unit 18, and a graphic processor 19. It may be understood that the LCD 1 also includes other circuits, such as a power circuit, and a signal output circuits, for example. These circuits are well-known circuits, and so are not described here.

The first to fourth sensors 11-14 sense direction, intensity, and color of light around the LCD 1 and generate optical analog signals correspondingly. In detail, the first to fourth sensors 11-14 sense point light at the four corners of the main body 10. Two of the first to fourth sensors 11-14 sense line light between two corresponding corners of the main body 10. Three of the first to fourth sensors 11-14 sense surface light among three corresponding corners of the main body 10.

The optical signal collecting unit 15 is connected to the first to fourth sensors 11-14 to receive the optical analog signals (including the point optical signals, the line optical signals, and the surface optical signals) generated by the first to fourth sensors 11-14, and convert the optical analog signals into optical digital signals.

The property saving unit 16 saves a plurality of predetermined display properties (such as luminance properties, color properties, contrast properties) of the LCD 1 and a plurality of predetermined optical signal ranges (including point optical signal ranges, line optical signal ranges, and surface optical signal ranges) corresponding to the predetermined display properties.

The property comparing unit 17 receives the optical digital signals from the optical signal collecting unit 15 and compares the optical digital signals with the plurality of predetermined optical signal ranges. When the digital signals is in a corresponding predetermined optical signal range (e.g., a corresponding point optical signal range, a corresponding line optical signal range, and a corresponding surface optical signal range) is determined. Then, the corresponding predetermined display properties are selected by the property comparing unit 17 according to the determined optical signal range.

The property setting unit 18 receives the selected display properties and output the selected display properties to the graphic processor 19. The graphic processor 19 receives the selected display properties and correspondingly changes display properties of the LCD 1.

The auto-adjusting switch 30 is connected to the graphic processor 19 to switch the graphic processor 19 to be controlled by an automatic adjusting mode or a manual adjusting mode. When the graphic processor 19 works in the automatic adjusting mode, the graphic processor 19 receives the selected display properties and correspondingly adjusts display properties of the LCD 1. When the graphic processor 19 is in the manual adjusting mode, the graphic processor 19 does not receive the selected display properties. At this status, the LCD 1 can be adjusted by controlling some display switches mounted on the LCD 1. In other embodiments, the auto-adjusting switch 30 can be omitted to save costs.

Figure 3:
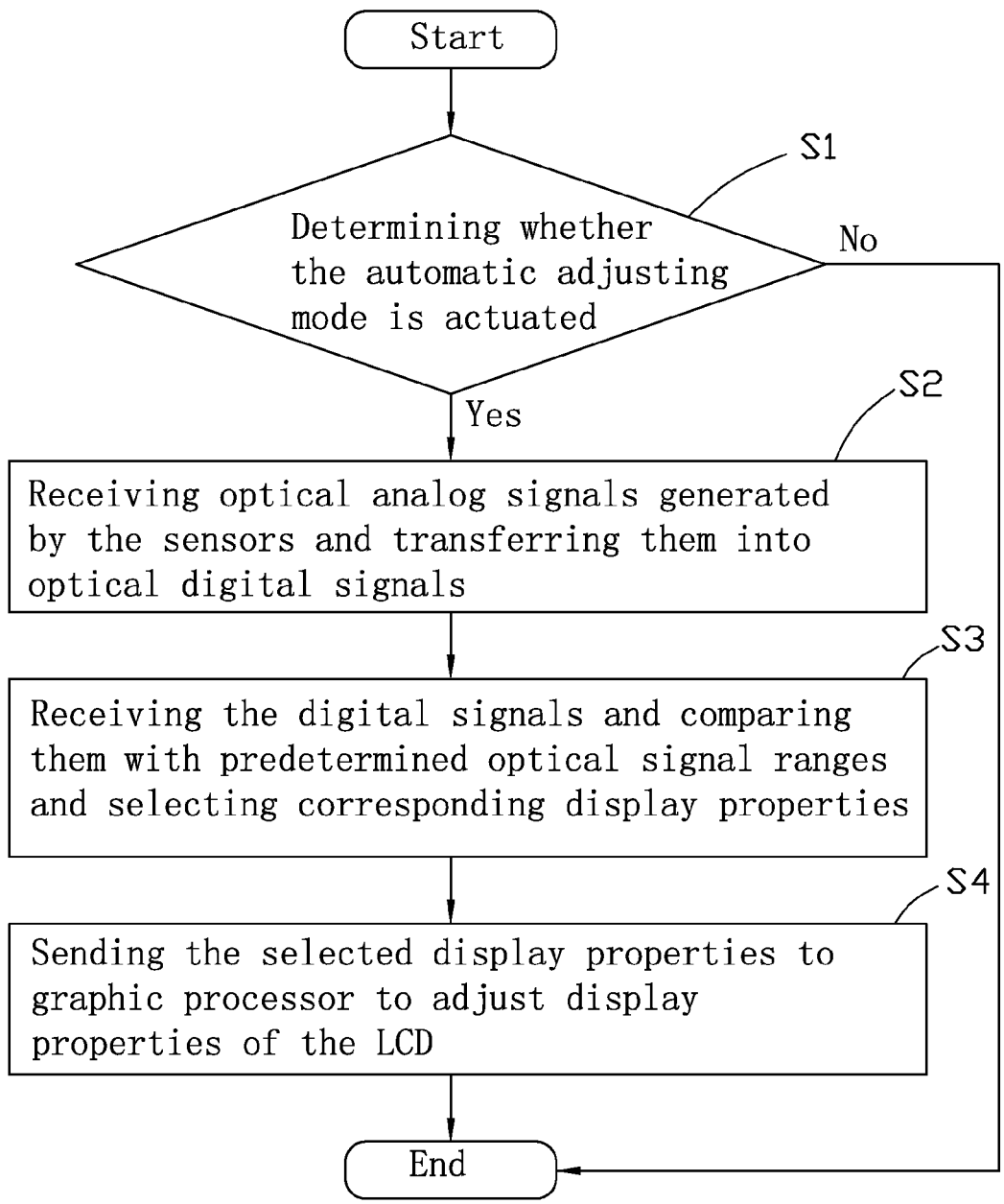
FIG. 3 is a flowchart of an exemplary embodiment of a display property adjusting method.

Referring to FIG. 3, an exemplary embodiment of a display property adjusting method includes the following steps.

In step S1, a determination is made whether the automatic adjusting mode of the auto-adjusting switch 30 is actuated. If the automatic adjusting mode of the auto-adjusting switch 30 is actuated, the process goes to step S2. If the automatic adjusting mode of the auto-adjusting switch 30 is not actuated, the process ends. In other embodiments, if the auto-adjusting switch 30 is omitted, this step can be omitted correspondingly.

In step S2, the optical signal collecting unit 15 receives optical analog signals (including the point optical signals, the line optical signals, and the surface optical signals) generated by the first to fourth sensors 11-14, and converts the received optical analog signals into optical digital signals.

In step S3, the property comparing unit 17 receives the optical digital signals from the optical signal collecting unit 15 and compares the optical digital signals with the predetermined optical signal ranges stored in the property saving unit 16, and then select predetermined display properties corresponding to a predetermined optical signal range that the optical digital signals are located in.

In step S4, the property setting unit 18 receives the selected display properties and outputs the selected display properties to the graphic processor 19, to adjust display properties of the LCD 1.

Display properties of the LCD 1 cannot be adjusted automatically without having to manual operate display property controllers mounted on the LCD in a manual operation mode, which is very convenient.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A liquid crystal display (LCD), comprising:
a main body;
a graphic processor, operable to adjust display properties of the LCD;
a plurality of sensors mounted on the main body of the LCD, to sense light around the LCD and generate optical analog signals correspondingly;
an optical signal collecting unit, operable to receive the optical analog signals generated by the plurality of sensors, and convert the optical analog signals into optical digital signals;
a property saving unit, operable to save a plurality of predetermined display properties of the LCD, and a plurality of predetermined optical signal ranges corresponding to the plurality of predetermined display properties;
a property comparing unit to receive the optical digital signals from the optical signal collecting unit and compare the optical digital signals with the predetermined optical signal ranges, and select corresponding predetermined display properties; and
a property setting unit to receive the selected display properties and output the selected display properties to the graphic processor to adjust display properties of the LCD;
wherein the plurality of sensors comprises four sensors mounted on four corners of the main body and sense spot light, two of the four sensors sense line light between corresponding two corners of the main body, and three of the four sensors sense surface light among three corresponding corners of the main body.

2. The LCD of claim 1, wherein the predetermined display properties comprise luminance properties, color properties, and contrast properties of the LCD.

3. The LCD of claim 1, further comprising an auto-adjusting switch connected to the graphic processor to switch the graphic processor to be controlled by an automatic adjusting mode or a manual adjusting mode.

4. A display property adjusting method for adjusting display properties of a liquid crystal display (LCD), the LCD comprising a plurality of sensors to sense light around the LCD, the display property adjusting method comprising:
receiving optical analog signals generated by the plurality of sensors, and converting the received optical analog signals into optical digital signals; wherein the plurality of sensors comprises four sensors mounted on four corners of the main body and sense spot light, two of the four sensors sense line light between corresponding two corners of the main body, and three of the four sensors sense surface light among three corresponding corners of the main body;
receiving the optical digital signals and comparing the optical digital signals with a plurality of predetermined optical signal ranges saved in a property saving unit, and then selecting corresponding predetermined display properties saved in the property saving unit; and
receiving the selected display properties and outputting the selected display properties to a graphic processor of the LCD, to adjust display properties of the LCD.

5. A liquid crystal display (LCD), comprising:
a main body;
a graphic processor, operable to adjust display properties of the LCD;
a plurality of sensors mounted on the main body of the LCD, to sense light around the LCD and generate optical analog signals correspondingly, wherein two of the sensors sense line light between the two sensors, and three of the sensors sense surface light among the three sensors;
an optical signal collecting unit, operable to receive the optical analog signals generated by the plurality of sensors, and convert the optical analog signals into optical digital signals;
a property saving unit, operable to save a plurality of predetermined display properties of the LCD, and a plurality of predetermined optical signal ranges corresponding to the plurality of predetermined display properties;
a property comparing unit to receive the optical digital signals from the optical signal collecting unit and compare the optical digital signals with the predetermined optical signal ranges, and select corresponding predetermined display properties; and
a property setting unit to receive the selected display properties and output the selected display properties to the graphic processor to adjust display properties of the LCD.

* * * * *